United States Patent
Lin et al.

(10) Patent No.: US 7,184,031 B2
(45) Date of Patent: Feb. 27, 2007

(54) METHOD AND CONTROLLER FOR IDENTIFYING A DRAG GESTURE

(75) Inventors: Jao-Ching Lin, Hsin Chuang (TW); Shyh-In Huang, Hsin Chuang (TW); Lin-Abel Chu, Hsin Chuang (TW); Chung-Yi Shen, Hsin Chuang (TW)

(73) Assignee: Sentelic Corporation, Taipei (TW)

( * ) Notice: Subject to any disclaimer, the term of this patent is extended or adjusted under 35 U.S.C. 154(b) by 414 days.

(21) Appl. No.: 10/776,977

(22) Filed: Jul. 6, 2004

(65) Prior Publication Data

US 2006/0007166 A1 Jan. 12, 2006

(51) Int. Cl.
*G09G 5/00* (2006.01)
(52) U.S. Cl. ........................ 345/173; 345/156
(58) Field of Classification Search ........ 345/173–177; 178/18.01–18.09; 715/863
See application file for complete search history.

(56) References Cited

U.S. PATENT DOCUMENTS

| | | | | |
|---|---|---|---|---|
| 5,880,411 A | * | 3/1999 | Gillespie et al. | 178/18.01 |
| 5,943,043 A | * | 8/1999 | Furuhata et al. | 345/173 |
| 6,037,882 A | * | 3/2000 | Levy | 341/20 |
| 6,856,259 B1 | * | 2/2005 | Sharp | 341/5 |
| 6,995,752 B2 | * | 2/2006 | Lu | 345/174 |
| 2002/0141643 A1 | * | 10/2002 | Jaeger | 382/181 |
| 2004/0103372 A1 | * | 5/2004 | Graham | 715/513 |
| 2006/0139340 A1 | * | 6/2006 | Geaghan | 345/177 |

* cited by examiner

*Primary Examiner*—Ricardo Osorio

(57) ABSTRACT

A method of identifying a drag gesture, with which the drag gesture is performed on a touch device and the method is characterized in that a drag signal can be generated when a sum of time duration of the first appearance and time span between an end of the first appearance time duration and a start of the second appearance is less than a first reference time, a sum of the first appearance time duration, the time span and a second appearance time duration is not less than the reference time value and an accumulated displacement of the second appearance time duration is not less than a reference displacement.

20 Claims, 5 Drawing Sheets

METHOD AND CONTROLLER FOR IDENTIFYING A DRAG GESTURE

BACKGROUND OF THE INVENTION

1. Field of the Invention

The present invention relates to a method and a controller for identifying a drag gesture and particularly to a method and a controller for identifying a drag gesture on a touch device and generating a drag signal, which simulates an object dragged by a mouse.

2. Description of Related Art

The graphical user interface (GUI) is a program operational interface developed by ZEROX PARC research center and the GUI is used in company with a pointing device such as a mouse. The user only needs to move the mouse with a visional type pointer and make a click then a desired action can be performed easily so as to solve the problem of inconvenience resulting from the text mode being required to input complicated instructions. Hence, the GUI was adopted by Apple computer company and Microsoft company one after another to become the most popular mode in all the operational systems. The pointing device has become a basic outfit in electronic equipment applying the GUI such as desktop computer, notebook computer, flat panel computer and personal digital assistance (PDA).

Currently, the pointing device includes external mouse and a track ball touch pad built in a portable computer system and a touch panel joined to the screen. The mouse is the earliest developed pointing device. Taking the mouse as an example for explaining the function of pointing device, the mouse can control the pointer on the screen of the electronic device, that is, where the mouse is moved, where the pointer is moved. Then, an execution instruction to the electronic device can be carried out by way of pressing the control button on the screen for a target ready to be executed. Nevertheless, design with lightness, smallness, shortness and thinness is a trend of electronic equipment and, for instance, the laptop computer is getting to replace the desktop computer so that the small sized touch device such as the touch panel is getting a main stream pointing device gradually.

The technique of current touch pad mainly includes capacitance type, resistance type, electromagnetic type, pressure type, inductance type, surface sound wave type and optical type. When a object body such as a finger moves on the touch pad, the pointer can be controlled to move along direction of the object body. Further, the pointer needs to have a function of carry out an order in addition to controlling movement of the pointer. Taking operating the mouse as an example, when the pointer moves to an object ready to be moved such as a program, a document or a picture, one of the buttons on the mouse such as the left button can be kept pressing in company with moving the mouse. In this way, the object can be dragged to other places. As for the touch device such as the touch pad, mostly there are two control buttons provided additionally instead of the left and right buttons on the mouse or the object body is defined to make a certain gesture on the touch device such that signals resulting from continuing pressing a button of the mouse can be generated along with the object being moved and dragged to other places.

An ordinary touch device usually simulates a drag movement of mouse with a drag gesture and the way to carry out the drag gesture is to implement a tap and a displacement following the tap immediately so as to let the object moving. Hence, U.S. Pat. No. 6,414,671 has disclosed a method for identifying a drag gesture on the touch device. With reference to FIG. 1, when a time duration $t_4$ of the object body appearance at the first time (i.e. stay time of the object body appearing on the touch device at the first time) is compared to the first reference time value, a drag signal 11 generates in case of the time duration $t_4$ being less than a first reference time value. Then, a time span $t_5$ between the first time appearance and the second time appearance is compared to a second reference time value and the drag signal 11 is kept and X, Y information generates repeatedly within the time duration $t_5$ at the second time in case of the time span $t_5$ being less than the second reference time value.

Although the conventional method can achieve the purpose of identifying the drag gesture, the time duration $t_4$ of first appearance and the time span $t_5$ between the first appearance and the second appearance being compared to a respective reference time value corresponding to them makes determination complicated. Also, X, Y information being generated repeatedly within the time duration $t_6$ of the second appearance results in more complicated design. Further, due to personal differences between users, time for various stages of movement done by each person during performing the drag gesture may be different from each other. Even the same person may have different time durations for movements while the drag gesture is performed at different times. Hence, it is easy for the conventional method to occur misjudgment. In addition, it is easy for the touch device to be touched accidentally during operation or to occur phenomena of temporary spike of the first appearance, temporary spike time span between the first appearance and the second appearance and temporary spike of second appearance due to the touch device generating noise at work or being caused by interference of foreign noise. The conventional method does not have a minimum time limitation to the time duration of first appearance, the time duration of second appearance and the time span between the first appearance and the second appearance so that it is easy to occur incorrect determination to the signal generated due to the noise interference.

SUMMARY OF THE INVENTION

An object of the present invention is provide a method and a controller for identifying a drag gesture with which a time summation of each movement is compared to a reference time value to achieve a more convenient and reliable determination.

Another object of the present invention is to provide a method for identifying a drag gesture with which time of each movement is required to be greater than a corresponding time value respectively so as to avoid a misjudgment effectively caused by noise.

A further object of the present invention is to provide a method and a controller for identifying a drag gesture with which an accumulated displacement during the second appearance is compared to a reference displacement so as to determine if the drag gesture is performed and achieve an accurate judgment.

The method of identifying a drag gesture with which the drag gesture is performed on a touch device according the present invention includes follow steps:

i. detecting a first appearance of an object on the touch device;

ii. detecting a second appearance of the object on the touch device; and iii. a sum of time duration of the first appearance and time span between an end of the first appearance time duration and a start of the second appearance being smaller than a first reference time and meeting one of following two situation, then generating a drag signal:

(A) another summation of the first appearance time duration, the time span and a second appearance time duration being not less than the reference time value; and (B) an accumulated displacement of the second appearance time duration being not less than a reference displacement.

BRIEF DESCRIPTION OF THE DRAWINGS

The present invention can be more fully understood by reference to the following description and accompanying drawings, in which.

DETAILED DESCRIPTION OF THE PREFERRED EMBODIMENT

Regarding the previously mentioned technical details, characteristics and effectiveness of the present invention, it can be fully understood by referring to the reference figures in the detailed explanation of the preferred embodiment of the present invention.

To start off, the method of identifying drag gesture according to the present invention is to be used on touch device. For explanation purpose, in the preferred embodiment of the invention, the capacitance type touch device is used for explanation.

Figure 1:
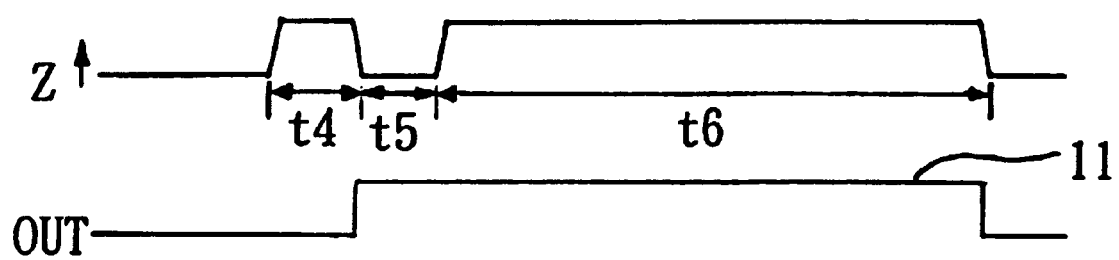
FIG. 1 is a graph showing time pulse of conventional drag gesture.
Figure 2:
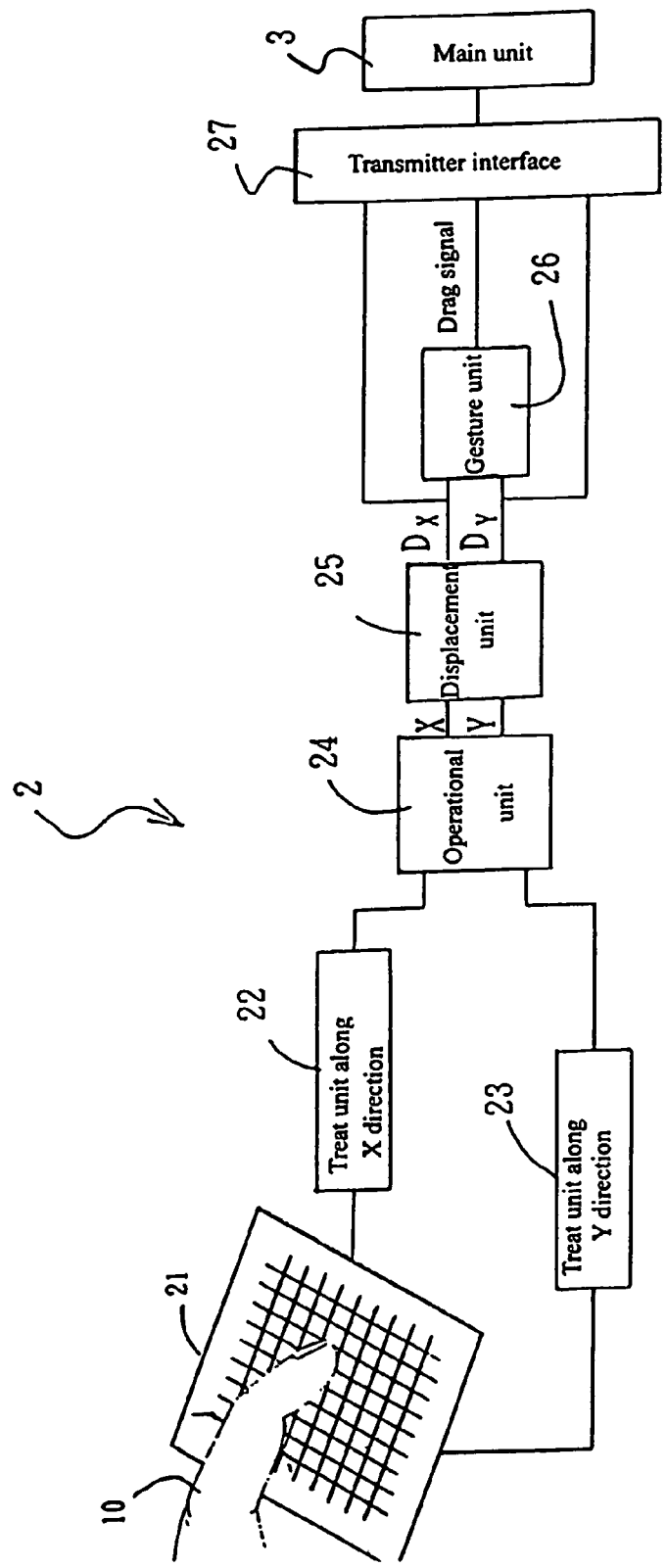
FIG. 2 is a block diagram of a touch device in a preferred embodiment of a method of identifying drag gesture according to the present invention.

Referring to FIG. 2, capacitance type touch device 2 mainly includes a touch pad 21, an operation module that consists of a treat unit along X direction 22, a treat unit along Y direction 23, an operational unit 24 and a displacement unit 25, a gesture unit 26 and a transmitter interface 27. The touch pad 21 has multiple wires distributed in the X and Y direction respectively and, for example, there are 16 wires in the X direction and 12 wires in the Y direction. Therefore, when a conductive object such as a finger 10 touches or in close contact with the touch pad 21, it causes a change in the capacitance on the touch pad 21. The treat units along X and Y direction 22, 23 immediately process the respective capacitance on the X and Y direction and transmit the data to operational unit 24. The operational unit 24 based on the received data will compute the X and Y coordinates of the object contact location. After that, the displacement unit 25 will receive the X and Y coordinates computed by the operational unit 24 and based on this information calculate relative displacements Dx and Dy corresponding to the contact signal of the object on the touch pad 21 and transmit them to the gesture unit 26 and transmitter unit 27. Thus, the calculated results Dx and Dy can be transmitted to a main unit 3 through the transmitter unit 27 so that the main unit 3 can control the movement of the pointer on the screen.

Main unit 3 can be a personal computer, laptop, personal digital assistant (PDA) or a cellular phone. In here, the previous mentioned components are related to the prior art and no detailed will be described further. Furthermore, the operational module, displacement unit 25, gesture unit 26 and transmitter interface 27 in the preferred embodiment of present invention are all assembled in a controller such as a chip.

The gesture unit 26 receives the calculation results Dx and Dy from the displacement unit 25 to determine if the object has produced an action qualified as a drag gesture on the touch pad 21 and also during this determination as whether the action is a drag gesture, correspondingly transmits out the first signal of the simulated dragging the mouse while holding the mouse button (this drag signal comprises of multiple consecutive signals), through the transmitter interface to the main unit 3 in order to carry out the corresponding control. The technical characteristic of the present invention is the method of identifying drag gesture in the gesture unit 26. The gesture unit 26 can achieve the method of identifying drag gesture through software, firmware or hardware. Moreover, even though the gesture unit 26 in the example of the present invention is embedded in the controller of the touch device 2, it can be installed in the main unit 3 as a software or hardware and not just limited to technique used or revealed in the preferred embodiment of the present invention.

Besides, even though a capacitance type touch device 2 is used as an example in the preferred embodiment of the present invention, persons familiar to the art should know that the present invention can be applied onto other types of touch device, such as optical type, resistance type, magnetic type, pressure type, inductance type, surface sonar type, supersonic type and so on. Therefore, it is not confined to just what is illustrated or revealed in the preferred embodiment of the present invention.

Figure 3:
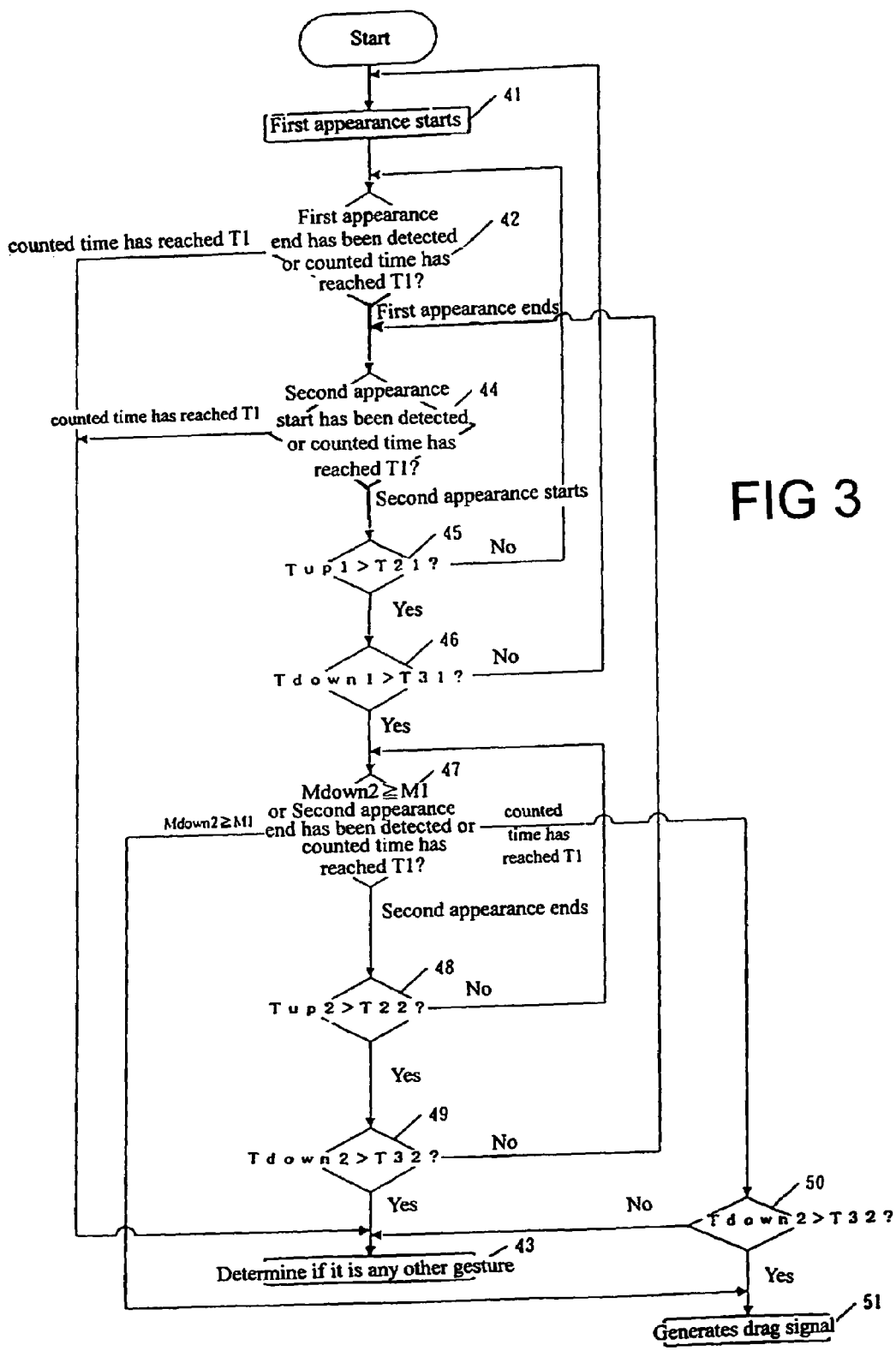
FIG. 3 is a flow chart of the embodiment shown in FIG. 2.

Referring to FIG. 3, it illustrates the flow chart of an example in the preferred embodiment of the present invention. In the example, first assume that an object such as a finger 10 has simultaneously tapped on the touch pad 21 twice. To simplify the explanation, in the following paragraphs, the object will be represented by the finger 10. Something worth noting is that even though a finger 10 is used to illustrate the preferred embodiment of the present invention, persons familiar with the conventional art should know that the touch device 2 of the preferred embodiment is suitable for detecting other types of conductive objects or multiple conductive objects, which are not confined to what is revealed in the preferred embodiment of the present invention.

First of all, in step 41, the touch device 2 detects the finger 10 on the touch pad 21 at the start of its first appearance. At the same time, the touch device 2 will start timing how long the finger 10 appears on the touch pad 21. In the present example, if it is assumed to be the drag gesture, there will be a detection of a second appearance within the first reference time value $T_1$. The range of the first reference time value T1 in the present example can be set between 100 ms~1000 ms (100 ms $\leq T_1 \leq$ 1000 ms) or it can be adjusted according to the need of the designer or the operating preference of the user.

Subsequently, in step 42, the touch device will continued to detect the appearance of the finger 10 on the touch pad 21 in order to determine which of the two conditions: the ending of the first appearing time duration or the timer after the first appearing time duration has reached the first reference time $T_1$, has been achieved first.

If in step 42, it has been determined that first appearing time duration has ended and the timer has not reached the first reference time $T_1$ which means that there may be a second appearance within the first reference time $T_1$, step 44 will continue to be executed. However, if in step 42, it has been determined that the timer has reached the value of first reference time $T_1$, and as only the first appearance occurred within the first reference time $T_1$ and the first appearing time duration $T_{down1}$ exceeds the first reference time $T_1$, it can be confirmed that it is not a drag gesture Thus step 43 will be executed by the gesture unit 26 to determine if the action is of any other gestures.

In step 44, touch device 2 continues to determine which of the conditions: the start of the second appearance time duration when the finger 10 is detected on the touch pad 21 or the timer has reached the first reference time $T_1$, has been achieved first. If in step 44, it has been determined that the start of the second appearance time duration is detected first, it implies that two appearances have occurred within the first reference time $T_1$ and it may be a drag gesture so step 45 will be continued. However, if in step 44, it has been determined that the timer has reached the value of first reference time $T_1$ first, it can be confirmed that it is not a drag gesture. Thus step 43 will be executed to determine if the action is of any other gestures.

Figure 4:
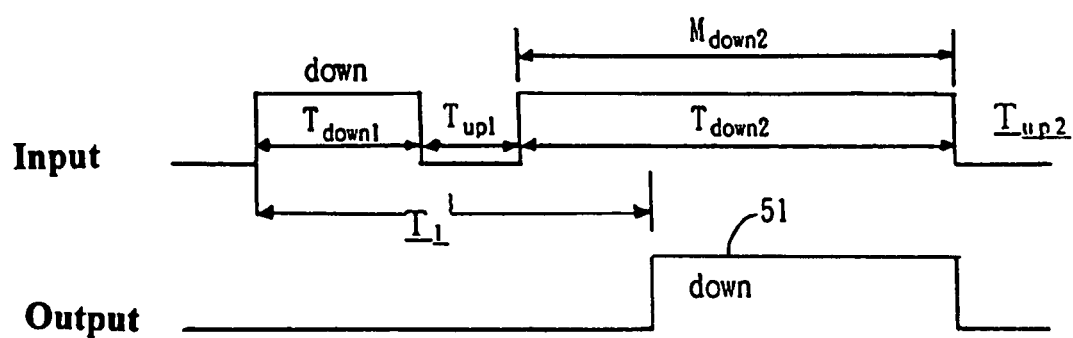
FIG. 4 is a graph showing time pulses of input and output signals in an example of the embodiment shown in FIG. 2.

If in step 44, it has been determined that second appearance has already started, referring to FIG. 4, touch device 2 has already obtained the first appearance time duration Tdown1 (referring to the time the finger 10 is maintained on the touch pad when it first appearance on the touch pad) and also the time span between the two appearance time durations Tup1 (referring to the time when the finger 10 first taps and leaves the touch pad until the time before the finger 10 taps on the touch pad 21 for the second time) in the previous detection.

Touch pad 21 during its operation can be easily touched by mistake or due to the noise generated by itself or noise from the surrounding environment and then produce inappropriate signals such as short first and second appearance time duration or short time span between the two appearance time duration. As these unwanted signals only last a short period of time, there is a requirement that the time duration of each action must be larger than the respective minimum time values, in order to effectively filter out inappropriate signals and thus enhance the accuracy of the identification.

Therefore, in step 45, first determine if the first time span $T_{up1}$ between the first appearance time duration $T_1$ and the second appearance time duration $T_2$ is larger than the first minimum UP reference time $T_{21}$. The first minimum UP reference time $T_{21}$ is the shortest effective time between the UP and DOWN of the finger 10. In the present example, the first minimum UP reference time $T_{21}$ ranges from 1 ms to 10 ms ($1\ ms \leq T_{21} \leq 10\ ms$) and it can be adjusted according to the need of the designer or the operating preference of the user. If step 45 determines the first time span $T_{up1}$ to be not larger than the first minimum UP reference time $T_{21}$ ($T_{up1} \leq T_{21}$), it represents that the signal of the first time span $T_{up1}$ is too short so the first appearance actually has not really finished yet and thus it will jump back to step 42. If step 45 determines that the first time span $T_{up1}$ is larger than the first minimum UP reference time $T_{21}$ ($T_{up1} > T_{21}$) it implies that the first time span between the two appearance durations is valid and therefore continues to step 46.

In step 46, determine if the first appearance time duration $T_{down1}$ is larger than the first minimum tap reference time $T_{31}$. Since usually when the finger 10 appearing on the touch pad 21 implies that the finger 10 is down on the touch pad 21, then the shortest effective time the finger 10 first tap on the touch pad 21 and stays on it is called the first minimum tap reference time $T_{31}$. If in step 46, it is determined that the first appearance time duration $T_{down1}$ is larger than the first minimum tap reference time $T_{31}$ ($T_{down1} > T_{31}$), it indicates that the first appearance is a valid signal and step 47 will be continued. However, if step 46 determines the condition to be false ($T_{down1} \leq T_{31}$), which implies that the first appearance is a noise signal and will be discarded, it will jump back to step 41 and resume to wait for the next first appearance.

When proceeding to step 47, it implies that the summation of the first appearance time duration $T_{down1}$ and the first time span between two appearance durations is smaller than the first reference time value $T_1$. During the drag gesture, it is just that the second appearance of finger 10 on the touch pad 21 lasts longer, or the accumulated displacement of the second appearance time duration is larger, therefore, in the preferred embodiment of the present invention, time and displacement will be used as condition to determine whether it is drag gesture and enhance the determination reliability. In step 47, determines which of the following three conditions is achieved first: detection of the finish of the second appearance time duration, the accumulated displacement of the second appearance time duration $M_{down2}$ is larger than the reference displacement value $M_1$ or the timer since the first appearance time duration has reached the first reference time $T_1$. The gesture unit 26 besides resuming the timer for the detection of the second appearance, it uses the result Dx and Dy from the displacement unit 25 to calculate the accumulated displacement of the second appearance time duration $M_{down2}$.

If in step 47, the finish of the second appearance time duration is detected first, the second appearance time duration $T_{down2}$ and the second time span after the end of the second appearance and before the UP of the finger 10 $T_{up2}$ will be obtained. At this time, if it is confirmed that the second time span $T_{up2}$ and the second appearance time duration $T_{down2}$ are valid signals and implies that within the first reference time $T_1$, two appearance have really been detected and the accumulated displacement of the second appearance time duration $M_{down2}$ is less than the reference displacement value $M_1$ ($M_{down2} < M_1$). Thus, it can be determined it is not drag gesture. Therefore, step 47 determines the detection of finish of the second appearance occurred first, step 48 and 49 will be continue to determine if the second time span $T_{up2}$ and the second appearance time duration $T_{down2}$ are valid signals.

In step 48, determine if the second time span $T_{up2}$ is larger than the second minimum UP reference time $T_{22}$. The range of the second minimum UP reference time $T_{22}$ in the present example can be set between 1 ms~10 ms ($1\ ms \leq T_{22} \leq 10$ ms) or it can be adjusted according to the need of the designer or the operating preference of the user. If step 48 determines that is the second time span $T_{up2}$ is larger than the second minimum UP reference time $T_{22}$ ($T_{up2} > T_{22}$), it implies that the second time span $T_{up2}$ is a valid signal and then proceed the determination in step 49. If step 48 determines that the second time span $T_{up2}$ is not larger than the second minimum UP reference time $T_{22}$ ($T_{up1} \leq T_{22}$), it implies that the signal of the second time span $T_{up2}$ is just noise signal and thus will be discarded and jump back to step 47. In the present example, the second minimum UP reference time $T_{22}$ can be set to be the same as the first minimum UP reference time $T_{21}$.

In step 49, determines if the second appearance time duration $T_{down2}$ is larger than the second minimum tap reference time $T_{32}$. If step 49 determines the second appearance time duration $T_{down2}$ is larger than the second minimum tap reference time $T_{32}$ ($T_{down2} > T_{32}$), thus it indicates the signal of the second appearance is a valid signal and therefore not a drag gesture so it will jump back to step 43 to continue to determine if it is of any other gestures. However, if step 49 determines that the second appearance time duration $T_{down2}$ is not larger than the second minimum tap reference time value $T_{32}$ ($T_{down2} \leq T_{32}$), it implies that the second appearance is a noise signal so it will be discarded and jump back to step 44 to wait if the second appearance time duration has really started. In the present example, the second minimum tap reference time $T_{32}$ can be set to be the same as the first minimum tap reference time $T_{31}$.

If in step 47, it is determined first that the timer since the start of the first appearance has reached the first reference time value T1, it can be confirmed that the second appearance to be valid signal and determined that the two appearances are due to drag gesture, so step 50 will be executed in order to determine if the second appearance is a valid signal.

In step 50, determine if the second appearance time duration $T_{down2}$ is larger than the second minimum tap reference time value $T_{32}$. If step 50 determines that the second appearance time duration $T_{down2}$ is larger than the second minimum tap reference time $T_{32}$ ($T_{down2} > T_{32}$), implies that the second appearance is a valid signal and if the summation of the first appearance time duration $T_{down1}$, time span between the two appearance time duration $T_{up1}$ and the second appearance time duration $T_{down2}$ is not smaller than the first reference time $T_1$ [$(T_{down1} + T_{down2} + T_{up1}) < T_1$], thus gesture unit 26 will output a drag signal through the transmitter interface 27 into the main unit 3 to notify the main unit that a drag gesture has been produced and simulate the drag signal produced by moving the mouse while holding the mouse button. If in step 50, it is determined that the second appearance time duration $T_{down2}$ is not larger than the second minimum tap reference time $T_{32}$, implies that the second appearance is noise, but since the timer from the start of the first appearance has reached the first reference time value $T_1$, it will jump back to step 43 to determine if the action is of any other gesture.

Figure 5:
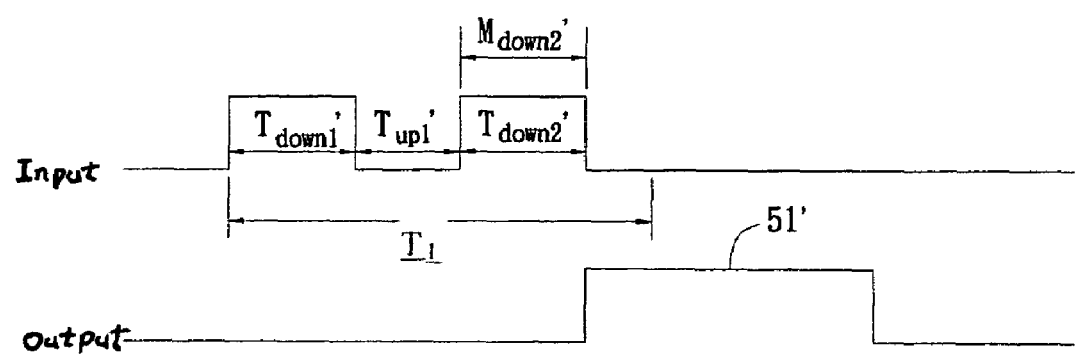
FIG. 5 is a graph showing time impulses of input and output signals in another example of the embodiment shown in FIG. 2.

If in step 47, it is determined first that the accumulated displacement of the second appearance time duration $M_{down2}$ is larger than the reference displacement $M_1$ ($M_{down2} \geq M_1$), it implies that even though the overall time durations of the two tap is relative short but the second tap (which is the second appearance) is dragging on the touch pad 21, the user is carrying out these action for the purpose of dragging so step 51 will be executed as in FIG. 5 to produce the drag signal. The range of the reference displacement $M_1$ in the present example can vary between 1 pixel and 10 pixel (1 pixel $\leq M_1 \leq$ 10 pixel), such as 3 pixel or it can be adjusted according to the need of the designer or the operating preference of the user.

According to what is claimed previously and also differing from the convectional method where the drag signal is produced immediately after the first tap, referring to FIG. 4, when the summation of the first and second appearance time durations and the time span between the two appearance time durations is larger or equal to the first reference time value $T_1$, [$(T_{down1} + T_{down2} + T_{up1}) \geq T_1$], and after the accumulated time from the start of the first appearance has reached the first reference time value $T_1$, only then the drag signal will be output. Besides this, referring to FIG. 5, when the summation of the first and second appearance time durations and the time span between the two appearance time durations is less than the first reference time value $T_1$, [$(T_{down1} + T_{down2} + T_{up1}) < T_1$], but the accumulated displacement of the second appearance time duration $M_{down2}$ is not smaller than the first reference displacement $M_1$, then during the second appearance, when the accumulated displacement is not less than the reference displacement, output the drag signal as in step 51.

Summarising the previous claims, the requirement for the drag gesture in the preferred embodiment of the present invention is defined by the following equations:

$$T_{down1} > T_{31} \quad \text{Eq. 1:}$$

$$T_{down2} > T_{32} \quad \text{Eq. 2:}$$

$$T_{up1} > T_{21} \quad \text{Eq. 3:}$$

$$T_{up1} > T_{22} \quad \text{Eq. 4:}$$

$$T_{down1} + T_{up1} < T_1; \text{ and} \quad 5:$$

a. $T_{down1} + T_{down2} + T_{up1} \geq T_1$; or b. $M_{down2} \geq M_1$

It should be noted that even the previous mentioned steps 42, 44 and 47 can simultaneously determine multiple conditions. The person familiar with the convectional arts should know that the previous mentioned steps 42, 44 and 47 can also determine the conditions sequentially, so it is not just limited to what has been revealed in the preferred embodiment of the present invention.

According to what is claimed previously and also differing from the convectional method where the time of the first appearance time duration and the first and second time span has to be respectively determined if they are smaller than their corresponding reference values and within the second appearance time duration, the X and Y information has to be output externally to be the calculation basis. The method of identifying drag gesture according to the present invention does not need to output X, Y information but take into account of the summation of the time for each action, Tdown1, Tdown2, Tup1 and to determine if it is less than the first reference time value T1 (refer to Eq. 5a), or determine that the accumulated displacement of the second appearance time duration Mdown2 is not less than the reference displacement M1 (refer to Eq. 5b), in order to achieve a fast and reliable determination. Moreover, the present invention further requires that the time duration of each action has to be larger than their respective reference values $T_{31}$ (refer to Eq. 1), $T_{21}$ (refer to Eq. 2) and $T_{22}$ (refer to Eq. 4) so as to effectively filter out the inappropriate signals generated due to disturbance and thus achieve a more accurate determination. In addition, the present invention also takes the advantage of the whether the accumulated displacement of the second appearance time duration $M_{down2}$ is not smaller than reference displacement $M_1$ to determine if it is a drag gesture (refer to Eq. 5b), this will enhance the user's operation, and further achieve a more accurate determination.

While the invention has been described with reference to the a preferred embodiment thereof, it is to be understood that modifications or variations may be easily made without departing from the spirit of this invention, which is defined by the appended claims.

What is claimed is:

1. A method of identifying a drag gesture, with which the drag gesture is performed on a touch device, the method comprising follow steps:

i. detecting a first appearance of an object on the touch device;
ii. detecting a second appearance of the object on the touch device; and
iii. a sum of time duration of the first appearance and time span between an end of the first appearance time duration and a start of the second appearance being smaller than a first reference time and meeting one of following two situation, then generating a drag signal:
(C) another summation of the first appearance time duration, the time span and a second appearance time duration being not less than the reference time value; and
(D) an accumulated displacement of the second appearance time duration being not less than a reference displacement.

2. The method of identifying a drag gesture as defined in claim 1, wherein the drag signal is generated once at the summation of the first appearance time duration, the time span between the end of the first appearance time duration and the start of the second time duration and the second appearance time duration exceeds the reference time value.

3. The method of identifying a drag gesture as defined in claim 1, wherein the drag signal is generated once the accumulated displacement of the second appearance time duration is not less than the reference displacement.

4. The method of identifying a drag gesture as defined in claim 1, wherein the drag signal is generated once the first appearance time duration is greater than a first minimum tap reference time value.

5. The method of identifying a drag gesture as defined in claim 1, wherein the drag signal is generated once the second appearance time duration is greater than a second minimum tap reference time value.

6. The method of identifying drag gesture as defined in claim 1, wherein the drag signal is generated once the time span between the end of the first appearance time duration and the start of the second time duration is greater than a first minimum raised up reference time value.

7. The method of identifying a drag gesture as defined in claim 1, wherein the touch device transmits the drag signal to the main unit.

8. A controller of a touch device for identifying movements of an object on the touch device, comprising:
an operational unit, detecting every appearance of the object on the touch device and producing a respective tap signal and the respective tap signal being generated corresponding to a start of the appearance on the touch device and being terminated when that appearance has already finished; and
A gesture unit, being connected to the operational unit so as to receive the tap signal and based on the tap signal to calculate the time duration of the object appearing on the touch device and then identify the action of the object;
wherein, the gesture unit receives from the operational unit a first tap signal and a second tap signal corresponding to the first and second appearance of the object on the touch device respectively; the gesture unit also computes a summation of time duration of the first appearance and time span between an end of the first appearance time duration and a start of the second appearance being less than a first reference time and compares the result with the first reference time and if it qualifies one of the two conditions below, the gesture unit will produce a corresponding drag signal:

A) if the summation of the first appearance time duration and the time span between the end of the first appearance time duration and the start of the second appearance is not less than a reference time value; and
B) If the accumulated displacement of the second appearance time duration is not less than a reference displacement.

9. The controller of a touch device for identifying a drag gesture as defined in claim 8, wherein the gesture unit generates the drag signal at the time of an accumulated time of the first appearance time duration, the time span and the second appearance time duration exceeds the reference time.

10. The controller of a touch device for identifying a drag gesture as defined in claim 8, wherein the gesture unit generates the drag signal once the accumulated displacement is not less than the reference displacement within the second appearance time duration.

11. The controller of a touch device for identifying a drag gesture as defined in claim 8, wherein the gesture unit generates the drag signal once the first appearance time duration is greater than a first minimum tap reference time value.

12. The controller of a touch device for identifying a drag gesture as defined in claim 8, wherein the gesture unit generates the drag signal when the second appearance time duration is larger than the second minimum tap reference time.

13. The controller of a touch device for identifying a drag gesture as defined in claim 8, wherein the gesture unit generates the drag signal once the time span is greater than the first minimum UP reference time.

14. The controller of a touch device for identifying a drag gesture as defined in claim 8, wherein the controller further includes a transmitter interface connected to the gesture unit for transmitting the drag signal to a main unit.

15. A gesture unit of the touch device for identifying movement of an object on the touch device; wherein the gesture unit receives from the touch device a first tap signal and a second tap signal generated corresponding to a first and second appearances of the object on the touch device respectively, computes a sum of a first appearance time duration and a time span between an end of the first appearance and a start of the second appearance and compares the sum with the a first reference time and in case of the sum being smaller than the first reference time value, a determination is done after one of two following conditions being met and the gesture unit generates a corresponding drag gesture:
A) If the sum of the first appearance time duration and the time span is not less than a reference time value; and
B) If an accumulated displacement of the second appearance time duration is not less than a reference displacement.

16. The gesture unit of the touch device as defined in claim 15, wherein the drag signal is generated once the sum of the first appearance time duration, the time span and the second appearance time duration is greater than the reference time value.

17. The gesture unit of the touch device as defined in claim 15, wherein the drag signal is generated once the accumulated displacement of the second appearance time duration is not less than the reference displacement.

18. The gesture unit of the touch device as defined in claim 15, wherein the drag signal is generated in case of the first appearance time duration is greater than the first minimum tap reference time.

19. The gesture unit of the touch device as defined in claim 15, wherein the drag signal is generated in case of the second appearance time duration is greater than a second minimum tap reference time.

20. The gesture unit of the touch device as defined in claim 15, wherein the drag signal is generated in case of the time span is greater than a first minimum raised up reference time.

* * * * *